March 3, 1959 W. E. WOLF ET AL 2,875,705
ADJUSTABLE AXLE GUIDE FOR RAIL VEHICLES
Filed May 27, 1955 3 Sheets-Sheet 1

INVENTORS.
Walter E. Wolf
and
Julius Ulsamer
By
Patent Agent.

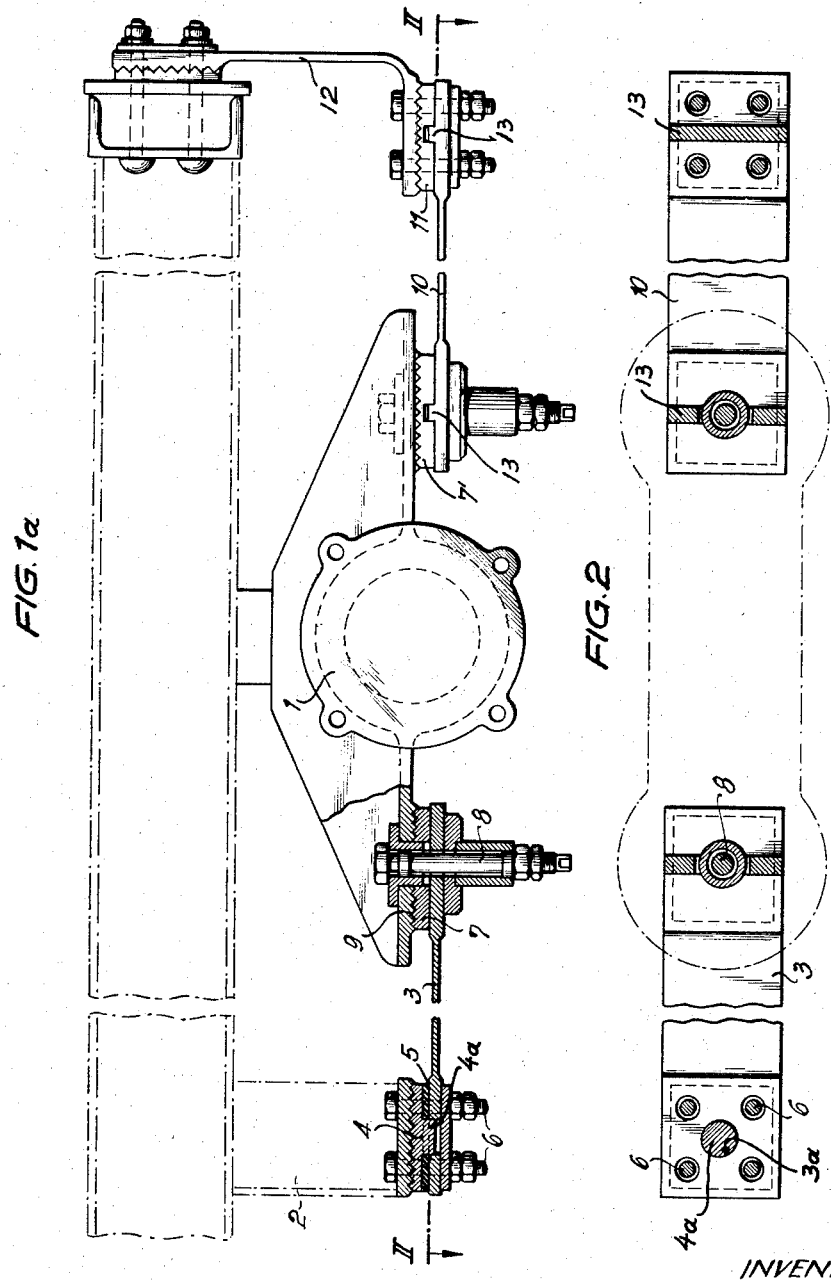

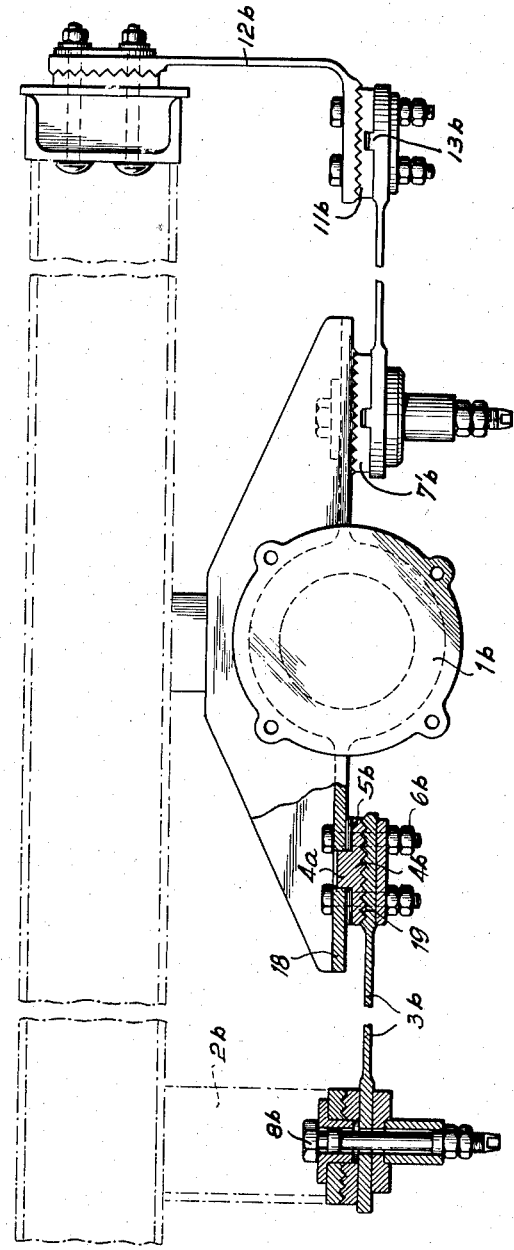

United States Patent Office 2,875,705
Patented Mar. 3, 1959

2,875,705

ADJUSTABLE AXLE GUIDE FOR RAIL VEHICLES

Walter E. Wolf, Koln-Deutz, and Julius Ulsamer, Junkersdorf, near Koln, Germany, assignors to Westwaggon, Vereinigte Westdeutsche Waggonfabriken Aktiengesellschaft, Koln-Deutz, Germany Application May 27, 1955, Serial No. 511,741

7 Claims. (Cl. 105—224)

The present invention relates to adjustable axle guides for rail vehicles, especially for high speed rail vehicles. More particularly, the invention relates to such adjustable axle guides which are built up by flat lying spring leaves arranged in the longitudinal direction of the vehicle and having one end connected to the axle-tree box while the other end is connected to the truck frame. The longitudinal forces are taken up by a connection between the axle guide and the respective connecting member (trunk frame or axle box) by means of serrated surfaces screwed together, while a coupling member is interposed between said guide and said connecting member.

When the connecting member of the axle guide, for instance the box connecting said guide with the truck frame, does not yield, in view of inaccuracies in the construction due to tolerances and other differences, it is hardly possible to bring the requirement of a precise fit of the serrated surfaces pertaining to each other into agreement with the desired precise position of the wheel set. At best, even with the most careful fitting work, tensions or stresses remain the moments or torques of which act upon the roller bearings of the axle box in a horizontal plane and damage said roller bearings.

Additional stresses occur at the connecting surfaces with the connecting parts. To the above have to be added the known unfavorable influences of a possible frictional oxidation at those surfaces which are screwed against each other under high pressure, particularly at the serrated surfaces which influences due to an increased notching effect result in a reduction in strength and may bring about a loosening of the connections.

It is, therefore, an object of the present invention to provide an adjustable axle guide for rail vehicles which will overcome the above-mentioned drawbacks.

It is another object of this invention to provide an axle guide which will have an increased life of usefulness over heretofore similar axle guides.

It is still another object of this invention to provide an adjustable axle guide which will be free from frictional oxidation, especially at the serrated surfaces inherent to such axle guides.

These and other objects and advantages of the invention will appear more clearly from the following specification in connection with the accompanying drawings, in which:

Fig. 1a illustrates on a larger scale than that of Fig. 1 a side view partly in section of the axle guide shown in Fig. 1.

Fig. 2 represents a section taken along the line II—II of Fig. 1a.

Fig. 3 shows an arrangement somewhat modified over that of Fig. 2.

General arrangement

Figure 1:
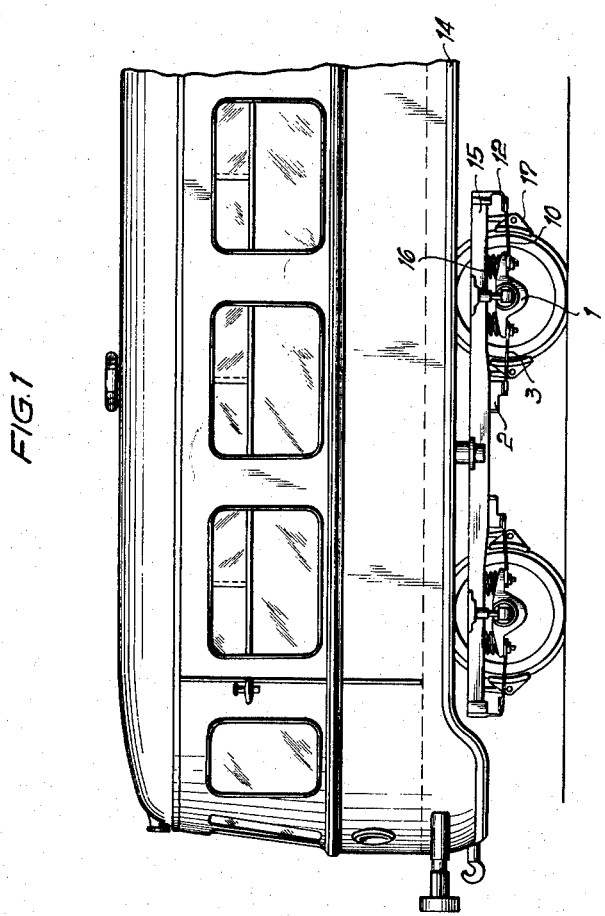
Fig. 1 illustrates a portion of a rail vehicle equipped with an axle guide according to this invention.

The drawbacks outlined above in connection with heretofore known axle guides have been overcome according to the present invention primarily by the fact that when a connecting member is employed which does not yield with regard to the guide, the coupling member is turnable about a vertical axis to a small extent with regard to one of the parts to be connected thereby.

Expediently, a vertical pivot arranged in the central portion of the coupling member engages a bore of the axle guide or of the bearing box, whereas screws arranged therearound extend with a small play through the parts to be interconnected and press the same against each other. The connection of transversely serrated surfaces is expediently effected by means of expansion screws in order, also during the operation, to maintain the press fit of the parts to be connected with each other when the rough elevations of the surfaces pressed against each other have worn off. By "expansion screws" are meant such screws which have their stem more than ordinarily reduced in diameter with regard to the thread thereof so that they can be pre-loaded or pre-turned to a considerably greater extent than ordinary screws. Thus, in the present instance, even when the serrated surfaces have worn off to a certain extent, a tight connection is still secured.

Between the pressure surfaces of the coupling member and the guide there may be provided a disc of natural or synthetic material having a high coefficient of friction as for instance brake shoe lining or clutch facing.

In order further to increase the life of the axle guide and in order to prevent frictional oxidation, especially along the serrated surfaces, the points of support of said parts may be coated with a non-oxidizing metallic material such as copper.

Structural arrangement

Referring now to the drawings and Fig. 1 thereof in particular, the rail vehicle shown therein is equipped with a truck and adjustable axle guide according to the invention. The car body 14 rests upon the truck frame 15. This truck frame 15 is by means of spiral springs 16 yieldably supported with regard to the axle box 1. The axle box 1 is guided by two leaf spring links 3 and 10 (see in particular Figs. 1a and 2). The leaf spring link 3 is fixedly connected by means of screws 6 to the truck portion 2 through the intervention of a disc 5 or friction material e. g. of the type used for brake shoe lining and clutch facing and through the intervention of a transversely serrated coupling member 4. The coupling member 4 by means of a stud section 4a engages a corresponding bore 3a in link 3 and is rotable with regard to the adjacent end of the axle guide or link 3. The brake shoes are designated with the reference numeral 17 (Fig. 1).

The other end of the guide spring or spring link 3 is by means of an expansion screw 8 fixedly and in a horizontal plane rigidly connected to the axle box 1 at the correspondingly serrated surface 9 of the latter. This connection is effected through the intervention of the coupling member 7 which is secured against displacement on the end of the spring link 3.

In a similar manner, the guide spring 10 absorbing transversely directed forces only is fastened to the other lateral cast on extension of the axle box 1. The other end of the guide spring or spring link 10 is by a coupling member 11 and the transversely serrated surfaces thereof connected to the horizontally bent-off portion of the angle 12. The coupling member 11 is likewise secured against displacement on the adjacent end of the spring link 10. The angle 12 is connected to the adjacent end of the truck frame 15 so to be yieldable in longitudinal direction thereof while being torsion resistant about its vertical axis. In this instance, the coupling member 11 need not be turnable as is the case with the coupling member 4 at the other axle box side. This is due to the fact that no material moments will be conveyed in the horizontal plane upon the axle box 1.

As will furthermore be seen from Fig. 2, the two inner ends of the spring links 3 and 10 and the outer end of spring link 10 are provided with a transverse rib 13 for engagement with corresponding grooves in the respective adjacent coupling members 7, 7′ and 11. In this way, said coupling members and spring links pertaining thereto are positively and properly aligned with regard to each other.

In order to prevent frictional oxidation at the transversely serrated connecting surfaces, the guide springs or spring links 3 and 10 as well as the coupling members 4, 7, 7′ and 11 may be provided with a copper coating.

With reference to the modification shown in Fig. 3, those parts thereof which correspond to parts in Figs. 1a and 2 have been designated with the same reference numerals as in Figs. 1, 1a and 2 but with the additional character "b." Also in the modification shown in Fig. 3, the spring link 3b has one end thereof connected to the truck portion 2a and the other end to the axle box 1b. In contrast to Fig. 1a, however, the coupling member 7 of Fig. 1a is replaced by a coupling member 4b with a stud section 4ab which latter pivotally engages a corresponding bore in arm 18 of the axle box 1b. A friction disc 5b is interposed between arm 18 and the adjacent marginal portion of the coupling member 4b. Bolts 6b connect the link 3b to the arm 18 of the axle box 1b. The connection of the outer end of link 3b to the truck portion 2b corresponds to the connection of the inner end of link 3 in Fig. 1a with the adjacent arm of the axle box 1.

It is, of course, to be understood that the present invention is, by no means, limited to the particular construction shown in the drawing but also comprises any modifications within the scope of the appended claims.

What we claim is:

1. An adjustable axle guide for a rail vehicle provided with a truck frame and with an axle box, which comprises in combination: a spring leaf having its ends arranged for connection with said axle box and said truck frame respectively, and serrated coupling elements respectively interposed between the ends of said spring leaf and the adjacent truck frame and axle box respectively for connecting the ends of said spring leaf with said truck frame and said axle box respectively, one of said coupling elements being to a small extent shiftable about a vertical axis relative to said spring leaf and said truck frame and axle box, said truck frame and said axle box being substantially non-yieldable with regard to said spring leaf.

2. An adjustable axle guide for a rail vehicle provided with a truck including a truck frame and an axle box, which comprises in combination: a flat spring leaf having its ends arranged for connection with said axle box and said truck frame respectively, a plurality of serrated coupling means respectively interposed between the ends of said spring leaf and the adjacent truck frame and axle box respectively for connecting the ends of said spring leaf with said truck frame and said axle box respectively, and pivot means associated with one of said coupling means and establishing pivotal connection between said last mentioned coupling means and the adjacent end of said spring leaf and the adjacent portion of said truck.

3. An adjustable axle guide for a rail vehicle provided with a truck including a truck frame and an axle box, which comprises in combination: a spring leaf having its ends arranged for connection with said axle box and said truck frame respectively, serrated coupling means respectively interposed between one end of said spring leaf and the adjacent truck frame and between the other end of said spring leaf and said axle box for connecting the ends of said spring leaf with said truck frame and said axle box respectively, one end of said spring leaf being provided with a bore, and the adjacent coupling means being provided with a stud pivotally extending into said bore to thereby establish pivotal connection between said spring leaf and the adjacent coupling means, the other end of said spring leaf and the adjacent coupling means being provided with passages, and bolt means having a diameter less than that of said passages and extending therethrough with play, said bolt means pressing the adjacent portions of said spring leaf, coupling means, and truck together while allowing a limited relative adjustment thereof with regard to each other.

4. An adjustable axle guide for a rail vehicle provided with a truck including a truck frame and an axle box, which comprises in combination: a flat spring leaf having its ends arranged for connection with said axle box and said truck frame respectively, serrated coupling means respectively interposed between one end of said spring leaf and the adjacent truck frame and between the other end of said spring leaf and the axle box respectively for connecting the ends of said spring leaf with said truck frame and said axle box respectively, said axle box being provided with a substantially vertical bore, and the coupling means adjacent said axle box being provided with a stud pivotally extending into said bore to thereby establish pivotal connection between said axle box and said adjacent coupling means, the said one end of said spring leaf and the coupling means adjacent thereto being provided with passage means, and bolt means having a diameter less than that of said passage means and extending therethrough with play, said bolt means pressing the adjacent portions of said spring leaf, coupling means and truck frame together while allowing a limited relative adjustment thereof with regard to each other.

5. An adjustable axle guide for a rail vehicle provided with a truck including a truck frame and an axle box, which comprises in combination: a spring leaf having its ends arranged for connection with said axle box and said truck frame respectively, serrated coupling means respectively interposed between the ends of said spring leaf and the adjacent truck frame and axle box, friction disc means interposed between the coupling means adjacent said truck frame and the adjacent end of said spring leaf, and bolt means connecting said last mentioned spring leaf with said coupling means and said truck frame while allowing a limited relative adjustment therebetween.

6. An adjustable guide for a rail vehicle provided with a truck frame and with an axle box, which comprises in combination: a spring leaf having its ends arranged for connection with said axle box and said truck frame respectively, serrated coupling means respectively interposed between one end of said spring leaf and the adjacent truck frame and between the other end of said spring leaf and said axle box, one of said coupling means being to a small extent shiftable about a vertical axis relative to said spring leaf and said truck frame and axle box, and connecting means connecting the ends of said spring leaf with said truck frame and axle box respectively while allowing said limited shiftability of said one coupling means about said vertical axis, each of said coupling means and at least the end portions of said spring leaf clamped together by said connecting means being provided with a non-oxidizing metallic protective cover.

7. An adjustable axle guide according to claim 6, in which said protective cover consists of copper.

References Cited in the file of this patent

UNITED STATES PATENTS

| 496,144 | Williams | Apr. 25, 1893 |
|---|---|---|
| 1,526,410 | Aspinwall | Feb. 17, 1925 |
| 2,614,508 | Archambault | Oct. 21, 1952 |

FOREIGN PATENTS

| 978,926 | France | Apr. 19, 1951 |
|---|---|---|
| 60,920 | Netherlands | Apr. 15, 1948 |